United States Patent [19]

Hoogerwoord

[11] Patent Number: 5,547,075
[45] Date of Patent: Aug. 20, 1996

[54] MULTIPURPOSE MAILING ENVELOPE

[75] Inventor: Ronald P. Hoogerwoord, Eerbeek, Netherlands

[73] Assignee: Nederlandse Pillo-Pak Maatschappij B.V., Eerbeek, Netherlands

[21] Appl. No.: 412,534

[22] Filed: Mar. 15, 1995

[30] Foreign Application Priority Data

Apr. 5, 1994 [EP] European Pat. Off. .............. 94250087

[51] Int. Cl.⁶ .......................... B65D 81/26; B65D 85/84; B65D 30/08
[52] U.S. Cl. ................ 206/204; 206/524.2; 206/524.3; 206/521; 206/522; 206/594; 383/111
[58] Field of Search ............................ 206/524.2, 524.3, 206/524.9, 521, 522, 523, 524, 204, 594; 383/110, 111

[56] References Cited

U.S. PATENT DOCUMENTS

| | | |
|---|---|---|
| 3,274,091 | 9/1966 | Amborski . |
| 3,485,281 | 12/1969 | Wicks ..................................... 383/111 |
| 3,867,874 | 2/1975 | O'Neil ..................................... 206/523 |
| 4,087,002 | 5/1978 | Bambara et al. ..................... 206/523 |
| 4,185,673 | 1/1980 | Daniello ................................. 383/111 |
| 4,529,087 | 7/1985 | Neal et al. ........................... 206/524.2 |
| 4,984,907 | 1/1991 | Power ..................................... 206/204 |

FOREIGN PATENT DOCUMENTS

| | | |
|---|---|---|
| 7338621 | 1/1974 | Germany . |
| 2836867 | 3/1980 | Germany . |
| 2852826 | 6/1980 | Germany . |
| 1552810 | 9/1979 | United Kingdom ................... 206/204 |

*Primary Examiner*—Paul T. Sewell
*Assistant Examiner*—Marie Denise Patterson
*Attorney, Agent, or Firm*—Young & Thompson

[57] ABSTRACT

A multipurpose mailing envelope which consists of a combination of an outer jacket of biodegradable material such as paper, cardboard or the like, and an inner jacket of soft elastic plastic padding material which stiffens the outer jacket and which is disposed loosely therein. The inside surfaces of the outer jacket and the outside surfaces of the inner jacket are hydrophilic and have adhesion which precludes undesirable slipping during production and/or filling. The outer jacket and inner jacket are easy to dispose of after use and can be easily separated by hand as appropriate to the material involved.

5 Claims, 1 Drawing Sheet

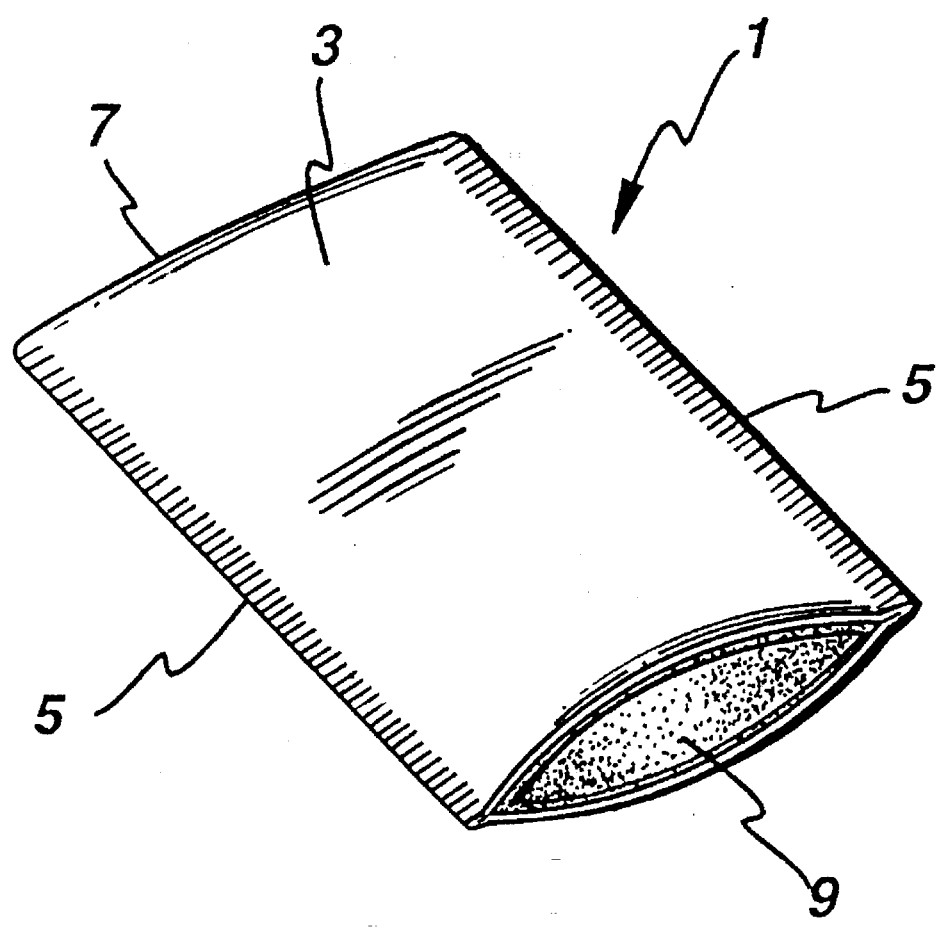

MULTIPURPOSE MAILING ENVELOPE

The invention relates to a multipurpose mailing envelope which consists of an outer jacket of essentially inflexible material such as paper, cardboard or the like, and padding of flexible plastic material, such as plastic foam or air cushion film (LP film) or also smooth plastic film.

In known multipurpose mailing envelopes of this type which have served outstandingly well in practice, for example, as described in German utility model No. 73 38 621 of the applicant, the outer jacket and the cushioning are securely joined to one another, for example, stuck or cemented over the entire surface or on the edges, or advantageously bonded on the edges. They form an all-over or partial surface laminate.

In spite of its very good utility properties as a packing and mailing aid a known laminate envelope of this type is disadvantageous with respect to the currently popular re-use of raw materials after use. As a result of the strong bond of materials of varied nature, the biodegradable paper stock of the outer jacket on the one hand and the plastic material of the cushioning and optionally the coating of the outer jacket on the other, their separation, if possible at all, must be done with technically complex measures, and problems which are undesirable from the current standpoint arise in the required waste disposal or processing.

When padded envelopes of the known type as a combination of the uncoated outer jacket and prefabricated inner jacket without attachment to one another are made as a combination which is simply inserted in one another, the outside dimensions of the inner jacket must be made more or less shorter and narrower than the inside dimensions of the outer jacket. This necessary tolerance causes the danger of slipping out of place and at worst the inner jacket sliding out of the outer jacket in rough packing activity. This danger is only eliminated when the packing process has ended and the fill opening of the padded envelope is sealed. The danger of the combined inner and outer jackets sliding out of one another is increased when in the time between production and use, in the storage of padded envelopes, the climatic conditions of the ambient atmosphere cause high atmospheric humidity. The paper comprising the outer jackets is inherently hydrophilic and thus can absorb moisture from the ambient atmosphere and release it. Conversely, the plastic material comprising the inner jackets is a hydrophobic material; moisture reaching the outside surfaces of the inner jackets, when it penetrates the paper stock, remains as a surface film on the plastic surface and intensifies the effect of the inner jacket slipping out of the outer jacket if this film can spread or form on the surface of the inner jacket. Since there is no resistance to possible passage of moisture through the hydrophilic paper stock material of the outer jacket to the surface of the inner jacket, this danger is especially acute when mailing envelopes kept in reserve are stored for a longer period of time.

This danger is especially serious when the padded envelopes are to be filled by machine. Slippage effects cause disruptive and intolerable process interruptions during mechanical filling.

It has been found that the these problems do not occur when the surfaces of the inner jacket facing the outer jacket are for their part made hydrophilic in the multipurpose mailing envelope according to the invention. Then, a type of adhesion sticking forms, which is preserved even during longer storage and under unfavorable ambient atmospheres containing high levels of moisture, between the inner jacket made shorter and narrower according to the inside dimensions of the outer jacket, and the outer jacket.

It is known that plastic surfaces can be roughened by various measures, especially by corona treatment, in order to make them more absorbent for application of coatings like adhesive and/or printing ink. As has been found, the surface of the plastic film which forms the inner jackets of the multipurpose padded envelopes according to the invention, such as LP film or foam film, can be treated in the manner of these known methods in order to make these inherently hydrophobic surfaces hydrophilic.

Performing this corona treatment in a gas atmosphere which is saturated with vapors of organic agents like acrylic acid and maleic acid is known. Other aliphatic acids in vapor form can also be used in corona treatment for imparting water-repellent properties. One such known process which is suitable for the purposes according to the invention is described for example in U.S. Pat. No. 3,274,091. As has been found this corona treatment can also be provided to render the plastic surfaces hydrophilic with the feed of a gas mixture of nitrogen and glycol vapor, advantageously in a mixing ratio of 60–90% by volume $N_2$ to 40–10% by volume glycol vapor.

Processes and devices for performing this gas-fed corona treatment can be taken from the prior art. Special LP films can be advantageously corona treated using a process and a device as are described in DE-OS 28 36 867.

This treatment of the film surfaces which form the inner jackets of the multipurpose mailing envelopes according to the invention to render them hydrophilic is advantageously done immediately before the outer jacket and inner jacket are joined in the production of mailing envelopes. For this reason it can be feasible, for purposes of optimum positioning in envelope production with high machine speeds, to provide individual adhesion points on the paper material with simple adhesives. Since paper material is bibulous, these adhesive points remain and disappear in the paper. For this reason neither the loose seat of the inner jacket in the outer jacket is adversely affected, nor is disposal and/or treatment of the paper mass disrupted since there are materials present and thus compatible in the paper stock anyway as are used or can be used for example for cementing the edge of the outer jacket.

Depending on the nature of the material for the outer jackets it can be advantageous if desired to also render the inside surfaces of the outer jacket hydrophilic. To do this conventional hydrophilicity agents can be used as impregnation agents or the material for the outer jacket can undergo corona treatment in the same way as the material for the inner jacket, as indicated above.

Multipurpose mailing envelopes according to the invention can be stored for any length of time and filled without difficulties in any case. After use their disposal is easy and as appropriate for the material involved. By simple mechanical separation, especially by hand, the inner jacket consisting of plastic material can be taken out. No material residues remain, neither paper residues adhere to the inner jacket nor plastic residues to the outer jacket. The different paper materials on the one hand and plastic materials on the other can be disposed of in the proper manner without additional expensive clean-up means, thus as they occur.

The terms "LP film", and "LP films" as used hereinabove refer to laminated polymeric air cushion films (air cushion film is colloquially referred to as "bubble cap" or "bubble-peak") which lend themselves specially well to the manufacture of containers and pouches and mailing envelopes. The films are fashioned to have cushioning characteristics by using bubble cap (also known as air cushioning) machinery, such as that described in U.S. Pat. Nos. 3,416,984, 3,405,020, 3,586,565, and 3,785,899, all assigned to Sealed Air.

The attached drawing is a perspective view of a multipurpose mailing envelope according to the present invention. As is there shown, the envelope generally indicated at 1 comprises two outer layers 3 of biodegradable paper stock as an outer jacket, which are securely joined to one another and which lie on top of one another, along side edges 5 and one transverse side edge is 7. Stiffening layers of soft elastic material comprising plastic padding in the form of air padding sheets 9 are located between the outer layers 3 and are securely joined to one another to form an independent inner jacket which is disposed loosely in the outer jacket. As explained above, the inside surfaces of this outer jacket and the outside surfaces of the inner jacket opposite one another are hydrophilic, the air padding sheets 9 being hydrophylic on their outer surfaces which form the outside of the inner jacket. The air padding sheets 9 have a smooth surface forming an inside of the inner jacket and a tufted surface forming an outside of the inner jacket, this outside surface being hydrophilic. The inside of the inner jacket, however, is not hydrophilic.

Also as explained above, each hydrophilic surface of both the inner jacket and the outer jacket is rendered hydrophilic by corona treatment accompanied by the feeding of a gas mixture consisting of nitrogen and glycol vapor.

I claim:

1. In a multipurpose mailing envelope, comprising an outer envelope of two outer layers of biodegradable paper stock as an outer jacket which are securely joined to one another and which lie on top of one another along long side edges and one transverse side edge, and with an inside surface which is free from plastic coating, and stiffening layers of soft elastic material comprising plastic padding in the form of air padding sheets which are located between said outer layers and which are securely joined to one another to form an independent inner jacket which is disposed loosely in said outer jacket; the improvement wherein inside surfaces of said outer jacket and outside surfaces of said inner jacket opposite one another are hydrophylic, said plastic padding material being hydrophylic on a surface thereof which forms an outside of said inner jacket, said air padding sheets having a smooth surface forming an inside of the inner jacket and a tufted surface forming an outside of said inner jacket which is hydrophilic.

2. Multipurpose mailing envelope according to claim 1, wherein only an outside surface of the inner jacket is hydrophilic.

3. Multipurpose mailing envelope according to claim 1, wherein the surface of the paper stock which forms the inside of the outer jacket is hydrophilic.

4. Multipurpose mailing envelope according to claim 1, wherein each hydrophilic surface is rendered hydrophilic by corona treatment.

5. Multipurpose mailing envelope according to claim 4, wherein said corona treatment accompanied by the feeding of a gas mixture consisting of nitrogen and glycol vapor.

* * * * *